(12) United States Patent
Wirz (10) Patent No.: US 10,279,409 B2
(45) Date of Patent: May 7, 2019

(54) METHOD AND DEVICES FOR THE RAPID AND FLEXIBLE DRESSING OF GRINDING WORMS

(71) Applicant: REISHAUER AG, Wallisellen (CH)

(72) Inventor: Walter Wirz, Pfaffikon (CH)

(73) Assignee: REISHAUER AG, Wallisellen (CH)

( * ) Notice: Subject to any disclaimer, the term of this patent is extended or adjusted under 35 U.S.C. 154(b) by 188 days.

(21) Appl. No.: 15/301,983

(22) PCT Filed: Mar. 9, 2015

(86) PCT No.: PCT/EP2015/054803
§ 371 (c)(1),
(2) Date: Oct. 5, 2016

(87) PCT Pub. No.: WO2015/154925
PCT Pub. Date: Oct. 15, 2015

(65) Prior Publication Data
US 2017/0136563 A1    May 18, 2017

(30) Foreign Application Priority Data
Apr. 8, 2014 (CH) .......................... 544/14

(51) Int. Cl.
*B23F 23/12* (2006.01)
*B24B 53/075* (2006.01)
*B24B 53/12* (2006.01)

(52) U.S. Cl.
CPC ........ *B23F 23/1231* (2013.01); *B24B 53/075* (2013.01); *B24B 53/12* (2013.01)

(58) Field of Classification Search
CPC ........ B23F 5/04; B23F 19/125; B23F 23/231; B24B 53/075
See application file for complete search history.

(56) References Cited

U.S. PATENT DOCUMENTS

| 3,602,209 A | 8/1971 | Bocker |
| 4,475,319 A | 10/1984 | Wirz |
| 4,708,544 A | 11/1987 | Faulstich et al. |
| 5,175,962 A | 1/1993 | Pedersen |

(Continued)

FOREIGN PATENT DOCUMENTS

| CN | 101754872 A | 6/2010 |
| DE | 86 07 328 U1 | 5/1986 |

(Continued)

OTHER PUBLICATIONS

International Search Report of PCT/EP2015/054803 dated May 21, 2015.

(Continued)

*Primary Examiner* — Timothy V Eley
(74) *Attorney, Agent, or Firm* — Sughrue Mion, PLLC (57) ABSTRACT

Disclosed is a method for dressing a single- or multi-thread grinding worm (34) in which a main rolling movement between the grinding worm and a gear-like dressing tool (90) is brought about. In order to create flank modifications on the grinding worm, an additional relative movement is superimposed on the main rolling movement. In addition, an auxiliary drive specifically designed for such a method, a correspondingly designed machine tool and a dressing tool for carrying out the method are disclosed.

23 Claims, 5 Drawing Sheets

(56) References Cited

U.S. PATENT DOCUMENTS

| | | | | |
|---|---|---|---|---|
| 5,379,554 A | * | 1/1995 | Thurman | B23F 21/005 451/177 |
| 6,234,880 B1 | | 5/2001 | Scacchi | |
| 6,302,764 B1 | * | 10/2001 | Wirz | B24B 49/02 451/11 |
| 6,491,568 B1 | * | 12/2002 | Jankowski | B24B 53/075 451/253 |
| 7,972,197 B2 | * | 7/2011 | Schenk | B23F 23/1225 451/11 |
| 8,527,085 B2 | * | 9/2013 | Breith | B23F 23/1225 451/177 |
| 8,882,564 B2 | * | 11/2014 | Kobialka | B24B 53/06 451/10 |
| 9,079,292 B2 | * | 7/2015 | Yanase | B23F 13/006 |
| 9,498,833 B2 | * | 11/2016 | Burri | B23F 17/006 |
| 2012/0190274 A1 | * | 7/2012 | Ito | B23F 23/1218 451/11 |

FOREIGN PATENT DOCUMENTS

| | | |
|---|---|---|
| DE | 43 29 360 A1 | 3/1995 |
| DE | 196 24 842 A1 | 1/1998 |
| DE | 197 06 867 A1 | 8/1998 |
| DE | 199 10 746 A1 | 9/2000 |
| DE | 10 2012 002126 A1 | 8/2013 |
| GB | 2 151 521 A | 7/1985 |
| JP | S62-24941 A | 2/1987 |
| JP | 1992-101774 A | 5/1993 |
| JP | H06-510242 A | 11/1994 |
| JP | 2005-081472 A | 3/2005 |
| JP | 2010-142883 A | 7/2010 |
| WO | 93/04810 A1 | 3/1993 |
| WO | 95/24989 A1 | 9/1995 |

OTHER PUBLICATIONS

Communication dated Jun. 20, 2017, from State Intellectual Property Office of the P.R.C. in counterpart application No. 201580018540.5.

International Preliminary Report on Patentability, dated Oct. 20, 2016, from the International Bureau in counterpart International application No. PCT/EP2015/054803.

Office Action issued in corresponding Japanese Patent Application No. 2016-560660 dated Sep. 4, 2018.

* cited by examiner

METHOD AND DEVICES FOR THE RAPID AND FLEXIBLE DRESSING OF GRINDING WORMS

CROSS REFERENCE TO RELATED APPLICATIONS

This application is a National Stage of International Application No. PCT/EP2015/054803 filed Mar. 9, 2015, claiming priority based on Swiss Patent Application No. 00544/14 filed Apr. 8, 2014, the contents of which are incorporated herein by reference in their entirety.

TECHNICAL FIELD

The present application relates to a method for dressing grinding worms, in particular grinding worms for continuous generation grinding, a dressing device specially designed for this purpose, a correspondingly prepared machine tool and a corresponding dressing tool.

PRIOR ART

Grinding worms are used for precision or finish machining of high precision toothings, in particular on gears of power transmissions of the kind used in large numbers in the vehicle industry, for example. The grinding method used in these processes is continuous generation grinding, a method which, while being highly efficient and accurate, also allows great flexibility as regards the flank shapes to be produced on the workpieces. On the one hand, this flexibility is provided by interaction between individual machine movements on several axes during the machining of the workpiece and, on the other hand, by the possibility of providing many different flank shapes on the grinding worm itself and of reproducing these on the workpiece.

The grinding worms are often made of dressable bodies that can be precision-machined using suitable tools, e.g. diamond tools. In the past, many different types of method have been developed for dressing these grinding worms, and these are, on the one hand, more or less complicated and, on the other hand, more or less flexible, depending on requirements.

In probably the majority of cases, dressing is nowadays performed with disk-shaped dressing tools, e.g. diamond-coated disks, wherein the flank of the dressing tool (also referred to below as the active surface) forms a negative image of the desired profile shape (i.e. the flank shape along the height direction of the profile) on the grinding worm. This allows relatively rapid dressing. In terms of movement, dressing takes place in a manner similar to thread milling or thread grinding, with the dressing tool rotating rapidly around an axis approximately parallel to the grinding worm axis and its active surface being moved past the rotating grinding worm axially parallel thereto. During this process, the dressing tool is in linear contact with the grinding worm over the entire profile height. As a result, the profile shape of the active surface of the dressing tool is transferred directly to the grinding worm flank. In general, several passes are needed to remove the entire dressing stock. In the case of multi-thread grinding worms, a corresponding procedure is required for all the threads. As soon as a different profile is required on the grinding worm flank, a dressing tool with a different flank profile is therefore necessary. Because the profile shape of the active surface on the dressing tool is transferred 1:1 to the grinding worm flank during dressing, the shape of the grinding worm flank furthermore cannot change over the width of the worm. More complex flank shapes, in particular, true free-form surfaces, of the kind required for topological grinding, cannot therefore be dressed by this method. Moreover, the speed of the grinding worm during dressing is severely limited because the dressing tool must of course move backward and forward continuously in accordance with the worm pitch.

Only linewise profiling is truly universal. In this method, which functions in a manner kinematically similar to the dressing process described above, disk-shaped tools are likewise used. However, these have an active surface (generally toroidal) only on the outer rim thereof. The radius of this surface, when viewed in an axial section of the tool, is small in relation to the profile height to be dressed, and, to a good approximation, the surface therefore has only point contact with the grinding worm flank during dressing. During the axial pass through the worm threads, therefore, only a line, also called a row, on the worm flank is dressed. In order to dress the entire profile height on the worm flank, a correspondingly large number of rows or passes is required, wherein each row is situated at a different diameter on the worm flank and, in the axial course thereof, under the control of an NC program, can in each case differ slightly from the adjacent one. Here, the selected spacing from row to row must be so small that the corrugation formed on the dressed flank is reduced to a sufficient extent. In the case of grinding worms with a multi-thread profile, the entire process is required for each thread. This necessarily leads to a very long dressing time; even in the most favorable case, it amounts to a multiple of the grinding time for a workpiece. In many cases, therefore, the dressing time is too long to be economical.

Developments of the abovementioned dressing method are disclosed in DE 197 06 867 B4. DE 196 24 842 A1 discloses methods in which some parts of the worm thread profile are dressed in linear contact and other parts are dressed approximately in point contact. Methods for linewise profiling are disclosed in WO 95/24989.

The quickest known but also, at the same time, the least flexible dressing method uses a "dressing master" as a tool; this is a cylindrical dressing gear or a dressing worm, which is the same in terms of toothing geometry. As regards module and modifications, the toothing shape of a dressing master corresponds precisely to the workpiece toothing to be ground. On its outer surfaces, it is coated with hard material grains, e.g. diamonds. Dressing is performed by bringing the dressing master into engagement with the grinding worm instead of a workpiece and shifting it past the grinding worm parallel to the worm axis, like a workpiece in the grinding process. As a result, the flank shape of the master is reproduced on the flanks of the grinding worm. If the profile shape of the worm threads is to be variable over the width of the grinding worm, this being necessary for the grinding of topological toothings, the dressing master must itself also have this topology, and the dressing master must move in the axial direction thereof simultaneously with the shift movement, giving rise in sum to a movement like that in diagonal shaving.

A machine on which dressing is carried out only by this method does not require a special dressing device if the dressing master is configured in such a way that it can be clamped in place instead of a workpiece and brought into engagement with the grinding worm; all the movements required for dressing are then the same as when grinding a workpiece. The required dressing time corresponds approximately to the grinding time for a workpiece. An example of a dressing method using a diamond dressing master is disclosed in U.S. Pat. No. 3,602,209.

Even though this method is quick, it is completely inflexible. Even if only slight changes are to be made to the modifications, it is generally at least necessary to rework the dressing master but, in most cases, a complete remanufacture is required. Both measures are associated with much effort and high costs. Moreover, the production of a master is generally very expensive since it must in every aspect have exactly the shape of the toothing to be ground, i.e. it is always a tailor-made individual production.

Overall, there is therefore as yet no usable method which is capable of dressing grinding worms efficiently and flexibly into a shape that can be described by an NC program. This is one reason why "topological grinding" has so far not become established in mass production, even though there is very much a requirement for it from the technical point of view. If a dressing method of this kind were available, it would thereby be possible to produce even very complex tooth systems economically. New possibilities in the optimization of power throughput and low noise levels of transmissions would then be opened up for designers.

SUMMARY OF THE INVENTION

It is an object of the present invention to provide a method for dressing a single- or multi-thread grinding worm which can work with a simple standard tool, which allows rapid dressing but which nevertheless is highly flexible as regards the flank modifications which can be produced.

The method according to the invention for dressing a single- or multi-thread grinding worm first of all has the following properties: a basic rolling movement is produced between the grinding worm and a gear-like dressing tool, i.e. a dressing tool having one or more teeth on the outer circumference thereof. For this purpose, the grinding worm is usually driven to perform a basic rotary movement around a grinding worm axis; the dressing tool is driven to perform a basic rotary movement around a dressing tool axis, wherein the dressing tool axis extends crosswise (transversely) with respect to the grinding worm axis, and a shift movement between the dressing tool and the grinding worm along the grinding worm axis is furthermore produced (e.g. by moving the grinding worm along the axis thereof relative to the dressing tool or by moving the dressing tool relative to the grinding worm along the axis thereof). The basic rotary movement of the grinding worm, the basic rotary movement of the dressing tool and the shift movement are then coupled in such a way that the grinding worm and the dressing tool are in correct rolling engagement at all times during the dressing operation. On the basis of the basic rolling movement alone, the dressing tool would always be at the same axial location relative to the region of the grinding worm flank with which the dressing tool is in engagement at any particular point in time of the dressing operation, i.e. the dressing tool would remove the same amount of stock from the grinding worm flank at all times during dressing.

To this extent, the method according to the invention corresponds fundamentally to a conventional dressing method using a dressing master and, to this extent, the flank shape of the teeth of the dressing tool would be reproduced on the grinding worm flank in this method.

According to the invention, an additional relative movement is superimposed on the basic rolling movement between the dressing tool and the grinding worm. This additional relative movement can be produced in various ways. The additional relative movement is preferably produced by an additional rotary movement of the dressing tool around the dressing tool axis, which is superimposed on the basic rotary movement of the dressing tool. As a result, there is a direct change in the amount of stock removed from the grinding worm flank by the dressing tool during dressing. As an alternative, however, it is also conceivable to superimpose an additional rotary movement on the basic rotary movement of the grinding worm. As a result, the grinding worm can be regarded as screwing itself against the flank of the dressing tool or away from the latter, thereby likewise changing the amount of stock removed from the grinding worm flank by the dressing tool during dressing. It is also conceivable to superimpose on the shift movement an additional axial movement between the grinding worm and the dressing tool along the grinding worm axis, wherein this additional axial movement can be produced by imposing an additional movement on the dressing tool relative to the grinding worm or by imposing an additional movement on the grinding worm relative to the dressing tool. Another, similar possibility is to implement the additional movement on the so-called X axis. In this case, a small relative movement takes place between the dressing tool and the grinding worm in that the dressing tool and the grinding worm move toward one another and away from one another with respect to a direction perpendicular to the axis of rotation of the dressing tool and perpendicular to the grinding worm axis. A relative movement along the so-called Z axis is also conceivable. These possibilities for producing the additional relative movement can also be combined.

By means of the additional relative movement, modifications are produced on the grinding worm flank, i.e. the grinding worm flank receives a profile shape which deviates from the shape that would result purely from the reproduction of the flank shape of the teeth of the dressing tool based on the coupling of rolling.

The method according to the invention thus divides the total relative movement between the grinding worm and the dressing tool into a basic rolling movement and an additional movement, wherein the additional movement represents the desired modifications of the grinding worm flank. If the additional movement is produced by an additional rotary movement of the dressing tool, for example, the overall rotary movement of the dressing tool is divided into a basic rotary movement with a basic speed $n_g$ and a superimposed additional rotary movement, which represents the desired modification.

The angular velocity $\omega_g$ of the basic rotary movement of the dressing tool depends exclusively on the geometrical characteristics of the dressing tool and of the grinding worm (specifically on the ratio i=z/g between the design number of teeth z of the dressing tool and the number of threads g on the grinding worm), on the angular velocity $\omega_s$ of the basic rotary movement of the grinding worm and on the speed $v_y$ of the shift movement. As will be described below, teeth can be missing from the dressing tool. The term "design number of teeth" is then used to refer to the number of teeth which an identical toothing with the same diameter and the same helix angle would have if no teeth had been removed. In other words, the design number of teeth is the number of teeth which would be present on the circumference of the dressing tool if in each case precisely one tooth were to plunge into each gap between two opposed flanks of the grinding worm during the rolling movement. The angular velocity of the basic rotary movement of the dressing tool has a fixed sign throughout the entire shift movement. At a constant angular velocity $\omega_s$ of the basic rotary movement of the grinding worm and a constant speed $v_y$ of the shift movement, the angular velocity of the basic rotary movement of the dressing tool is also constant. The angular velocity of the basic rotary movement changes only if the angular velocity of the grinding worm and/or the shift speed change. The basic rotary movement of the dressing tool thus corresponds to the rotary movement of the workpiece as produced in standard fashion on known generation grinding machines.

The additional relative movement depends on the angle of rotation of the grinding worm. The amount of movement thus changes as a function of the angle of rotation of the grinding worm. At the same time, the additional relative movement changes direction several times during the dressing operation. As will be explained in greater detail below, these changes of direction generally take place approximately periodically in relation to the rotation angle of the grinding worm. In particular, if the intention is ultimately to produce a simple profile modification on the workpiece that is constant across the width of the workpiece (e.g. a simple profile crowning without "topological" modifications), the same additional movement pattern is repeated periodically across the entire shift range. The dressing result then corresponds to the one that can be achieved with known dressing disks. If more general "topological" modifications on the workpiece flank are desired, the additional movement pattern across the shift range additionally varies as a function of the shift path. The modification produced on the grinding worm flanks is therefore different at each shift position or at each location across the width of the worm. Throughout the entire dressing operation, the speed of the additional relative movement generally essentially averages out to zero.

The additional relative movement is preferably produced on the NC control. The modifications can be specified in an NC program of an NC control device and can be changed quickly if required. The NC program then converts the modifications into the corresponding additional movements of the dressing tool and/or the grinding worm. As with the very much slower known process of linewise profiling, even complex 3D free-form surfaces can be dressed by means of an NC program in this way. In contrast to linewise profiling, the method according to the invention is very efficient.

The method according to the invention uses the characteristic that only point contact normally arises between the flanks in an engagement between two cylindrical gears meshing with crossed axes. In terms of toothing geometry, a grinding worm is a cylindrical gear with steep helical toothing. The method according to the invention now exploits the fact that the contact tracks which form on the worm flank during meshing are almost independent of the geometry of the toothing of the cylindrical gear. Whether or not it is straight or helical toothing with great or small crowning, with or without superimposed topology: the contact tracks on the worm flank always have approximately the same configuration, namely extending over the flank in a spiral, usually over approximately two thread pitches from the root to the tip or from the tip to the root. It follows from this that almost the same contact tracks are formed on the grinding worm flank when grinding unmodified straight toothing in a continuous generating method as if topologically modified helical toothing were being ground, for example. That the contact tracks are not exactly the same is due to the fact that the pressure angle in the regions of the modifications changes slightly. However, since the modifications are generally at least two orders of magnitude smaller than the corresponding profile heights, the deviations are very small overall.

If an unmodified, theoretically exact straight involute toothing with a number of teeth z is now notionally brought into engagement with a worm having a number of threads g, which is not a grinding worm but a transmission worm, the flanks of which, however, have exactly the shape which a grinding worm for grinding a crowned toothing would have to have, there would be flank contact approximately at the contact tracks mentioned, but irregular running of the gear would result. The law of gearing would no longer be satisfied, i.e. the transmission ratio $i=z/g$ would no longer be constant for each angle of rotation of the grinding worm. Effectively, the situation would even be such that it would only ever be possible for a single flank of the straight toothing to be in contact, even if the contact ratio were approximately two, which is almost always the case with normal toothing, or, in other words, there would no longer be any contact with the worm flank over the entire length of the contact tracks. This is because it would only ever be possible for that gear flank to be in contact with the worm in the generating region which is closest to the zones with the instantaneously greatest positive modification amounts. At this point in time, the respective leading or trailing flank would have no contact with the worm flank.

The situation would be different if just a single flank of the straight toothing were to roll through the worm, as it were in a toothing in which z−1 teeth of z teeth had been removed. In this case, engagement would no longer be disrupted by a leading or trailing flank. Of course, there would then still be irregular running for the duration of engagement, but the contact tracks on the worm flank would then in each case come into use over their entire length. The irregularity of the rotary movement of the straight toothing would now be a reproduction of the modifications present on the worm.

To be more precise: as it rolled through the worm, the rotary movement of this gear with the single tooth would be made up of the basic rotary movement, which is given by the ratio of the number of teeth to the number of threads $i=z/g$, the rotary movement of the worm and the shift movement $v_y$, and a superimposed fraction of very small additional rotary movements (also referred to below as "micromovements"), which would be obtained on the basis of the modifications on the worm flanks. Here, the amount and direction of the small rotary movements would depend on the angle of rotation of the worm.

It is self-evident that, in this consideration, the opposing flank of the individual tooth must never be in contact; on the contrary, the rear side of the tooth of the straight toothing would have to be set back so far that there would always be sufficient clearance with respect to the opposing flank of the worm.

If this theoretical model is applied to a topologically modified worm, a different superimposed micromovement would be obtained at each shift position at which the tooth flank would roll through the worm threads during the shifting of the "single-tooth" gear across the width of the worm. In this case, the amount and direction of each individual one of these micromovements would not only be associated with the angle of rotation of the worm but also with the respective shift position. The totality of all these superimposed micromovements would then represent the total topological shape.

If, as the next step, the worm described above is once again replaced by a grinding worm and the straight toothing with omitted teeth is replaced by a dressing tool coated with diamonds or other suitable hard material grains, which is driven by suitable means to rotate in the irregular manner just described, the grinding worm can thereby be dressed to the desired shape. During the continuous movement the dressing tool is shifted across the width of the worm to ensure that the worm is fully dressed; during this process, the pattern of superimposed micromovements changes continuously in terms of amount and direction as a function of the shift position. The profiling of the opposing worm flank is performed in a similar way in a second pass with the opposing flank of the tooth on the dressing tool.

In the above considerations, the starting point is a dressing tool with a single tooth. However, it is also quite possible for the dressing tool to have more than just one tooth on the circumference. The only condition is that the teeth should be so far apart that two or more flanks facing in the same direction (i.e. right or left flanks) never come into engagement simultaneously; i.e. the spacing between two successive teeth should always be greater than the length of engagement. This ensures that the teeth do not interfere with one another as the micromovement is performed. In the vast majority of cases, this is the case if only every third tooth is present. Thus, an exemplary dressing tool could appear as though two of every three teeth had been removed from a straight-toothed gear having z teeth. On the remaining teeth, the tooth thickness should be reduced to such an extent that two-flank contact with the grinding worm can never occur.

The starting point in the above considerations was a straight toothing on the dressing tool. However, the considerations can also be readily applied to helical toothing.

Expressed more generally, a preferred dressing tool has on its outer circumference one or more, preferably identically designed, teeth of straight or helical toothing. Each tooth has a tooth height in the radial direction and a tooth thickness in the circumferential direction. A tooth spacing in the circumferential direction is provided between two teeth in each case. The tooth thickness and tooth spacing are then selected so that the dressing tool and the grinding worm make contact at no more than a single contact point at each point in time during the dressing process.

The dressing tool is preferably derived from a straight- or helically toothed gear having a design number of teeth z, wherein there is a reduced number of teeth on the gear relative to the design number of teeth z and wherein at least one tooth is omitted in each case between two existing teeth. Two or three teeth are preferably omitted in each case.

By means of the method according to the invention, closely adjacent dressing tracks are produced on the grinding worm flank, said tracks resulting overall in a predeterminable grinding worm flank shape. In principle, these dressing tracks correspond to the contact tracks which also occur during the subsequent grinding in contact with the workpiece flanks.

As already mentioned, the additional relative movement between the dressing tool and the grinding worm is preferably produced by superimposing an additional rotary movement on the basic rotary movement of the dressing tool. Among the reasons why this is preferred is that the moment of inertia of the dressing tool is generally considerably less than the moment of inertia of the grinding worm, and therefore rapid additional rotary movements at the dressing tool can be produced more easily than at the grinding worm. Moreover, rapid additional rotary movements of the dressing tool can generally be produced more easily and more precisely than rapid small axial additional movements between the grinding worm and the dressing tool along the grinding worm axis. The additional rotary movement of the dressing tool can be produced in various ways. A first possibility consists in producing both the basic rotary movement and the additional rotary movement of the dressing tool by means of a common drive. A second possibility consists in providing separate drives for this purpose.

In particular, embodiments are possible in which the dressing tool is clamped instead of a workpiece on a work spindle having a work spindle drive and in which the work spindle drive produces both the basic rotary movement and the additional rotary movement of the dressing tool. In other words, the work spindle serves as a dressing spindle in such embodiments. For dressing on a tooth flank grinding machine that can grind in a continuous generating process, the method in principle requires only a special dressing tool that can be clamped on the work spindle instead of the workpiece. Theoretically, a special dressing device is not necessary. However, it is a prerequisite that the work spindle can perform the required additional rotary movements with sufficient accuracy and speed.

In practice, however, it will often be the case that the work spindle or the drive thereof is not ideally suited to the production of the required small additional rotary movements. For reasons of rigidity, the work spindles of continuous generation grinding machines are generally of very robust construction, and therefore they also have a relatively large moment of inertia. This is actually desirable for grinding since it filters out disturbing forces, but it makes it more difficult to perform selectively applied, small and rapid additional rotary movements. The drive control system is also optimized primarily for good disturbance behavior, while the guidance behavior is not of primary decisive importance. The requirements on a system which is supposed to produce small but rapid rotary movements are precisely opposed: a mass which is as small as possible and a drive control system which has very good guidance behavior. It is therefore advantageous if a special dressing device is provided.

Accordingly, embodiments in which the dressing tool is clamped on a separate dressing spindle having a dressing spindle drive are possible, wherein the dressing spindle drive produces both the basic rotary movement and the additional rotary movement of the dressing tool.

However, embodiments in which the additional rotary movements are produced separately by an additional drive are also possible. In this case, the basic rotary movement of the dressing tool can be made available by the workpiece drive. However, the basic rotary movement of the dressing tool can also be produced by a separate dressing spindle optimized for dressing. In many cases, this is the most expedient solution, even though it entails a not inconsiderable expense. Which of the designs is the most favorable depends on the machine concept and on how and for what purpose the machine is to be used.

In both cases, the additional movements of the dressing tool are produced by a special additional drive matched to the specific requirements, which is mounted on the work or dressing spindle. A special feature of this additional drive is that it is itself seated on a rotating spindle. In this case, therefore, the dressing tool is clamped on the additional drive, wherein the additional drive itself is mounted on a work or dressing spindle having a work or dressing spindle drive. The work or dressing spindle drive then produces the basic rotary movement of the dressing tool, and the additional drive produces the additional rotary movement.

Accordingly, the invention also relates to an additional drive for driving a gear-like dressing tool, said drive being distinguished by the following characteristics: the additional drive is designed to be mounted on a work or dressing spindle of a machine tool, which produces a basic rotary movement around a work or dressing spindle axis, and the additional drive can be controlled by an NC controller, such that the additional drive can superimpose an additional rotary movement around the work or dressing spindle axis on the basic rotary movement.

Many different embodiments are conceivable for the configuration of the additional drive, e.g. embodiments having normal servomotors or torque motors or having piezoelectric actuators. There are likewise many different possibilities conceivable for exchanging energy and data with the rotating dressing device. These include embodiments with slip rings and systems that operate without contact. In the case of systems that operate without contact, it is possible, in particular, for the energy and/or the data to be transferred inductively by means of a transformer, one winding of which is stationary and the other winding of which rotates with the dressing device. Data can also be transferred optically.

The invention also relates to a machine tool which is specially designed to perform the method according to the invention. A machine tool of this kind comprises:
- a grinding worm spindle having a grinding worm spindle drive for producing a rotary movement around a grinding worm spindle axis;
- a grinding worm, which is clamped on the grinding worm spindle;
- a gear-like dressing tool;
- a work or dressing spindle having a work or dressing spindle drive for producing a basic rotary movement of the dressing tool around a work or dressing spindle axis, wherein the work or dressing spindle axis extends crosswise with respect to the grinding worm spindle axis;
- a shift drive for moving (shifting) the grinding worm spindle and the work or dressing spindle relative to one another along the grinding worm axis;
- a horizontal feed device for moving the grinding worm and the dressing tool toward one another and away from one another; and
- an NC controller, which electronically couples the grinding worm spindle drive, the work or dressing spindle drive and the shift drive in order to produce a basic rolling movement between the grinding worm and the dressing tool during the dressing process.

In order to be able to perform the method according to the invention, provision can then be made for the NC controller additionally to control the work or dressing spindle drive, the grinding worm spindle drive, the shift drive and/or the horizontal feed device in such a way that an additional relative movement is superimposed on the basic rolling movement in order to produce additional modifications of the grinding worm flank. As an alternative, provision can be made for the machine tool to have an additional drive of the abovementioned type, wherein the NC controller controls this additional drive in such a way that it superimposes an additional rotary movement around the work or dressing spindle axis on the basic rotary movement of the dressing tool in order to produce the additional modifications of the grinding worm flank. In both cases, the NC controller can have a processor and a memory, wherein the memory is used to store a software program which, when executed on the processor, produces output signals of the NC controller which represent the additional relative movement (micromovement).

The invention furthermore makes available a dressing tool for use in a dressing method of the abovementioned type. The dressing tool is coated with hard material grains and is derived from a (straight- or helically toothed) gear having a design number of teeth z, wherein there is a reduced number of teeth on the gear relative to the design number of teeth z and wherein at least one tooth is in each case omitted between any two existing teeth.

To enable the outside diameter and/or the thread root of the grinding worm to be dressed at the same time as the flanks, the dressing tool can have zones coated by hard material grains for turning a grinding worm outside diameter and/or for plunge cutting a grinding worm thread root. Given appropriate choice of the diameters for these two dressing zones, there is the not to be underestimated advantage of this method that, within certain limits, the outside diameter of the grinding worm or profile height of the worm thread can be freely selected or set independently of all other profile features.

The same number of teeth can be omitted in each case between any two existing teeth. In many cases, a number of two or three omitted teeth can be appropriate. However, it is also conceivable for a larger number of teeth, e.g. four, five or six teeth, to be omitted. However, a dressing tool on which two teeth are always omitted in each case would have only limited usability for dressing grinding worm with thread numbers that are divisible by three for easily discernible reasons: this would mean that only one worm thread could be dressed in each pass. Instead, however, it is also possible to select a different distribution for the remaining teeth on the circumference. A regular pitch is not a prerequisite here, i.e. it is possible, for example, in each case to omit two, then three, then two teeth again, etc., on the circumference between any two remaining teeth. The software for controlling the micromovement is then adapted accordingly to the distribution of the active teeth.

The existing teeth can have a flank shape which corresponds to an unmodified or a modified flank shape for a predetermined type of toothing with the design number of teeth z. If the toothing to be produced is a modified involute toothing, for example, the existing teeth preferably have an involute shape. If the flank shape of the existing teeth on the dressing tool itself has already been modified, it may be possible, under some circumstances, for the grinding worm for grinding gears with similarly modified flanks to be dressed significantly more quickly because the required additional rotary movements may then be much smaller.

BRIEF DESCRIPTION OF THE DRAWINGS

Preferred embodiments of the invention are described below with reference to the drawings, which serve only for illustration and should not be interpreted to be limiting. In the drawings.

DESCRIPTION OF PREFERRED
EMBODIMENTS

Figure 1:
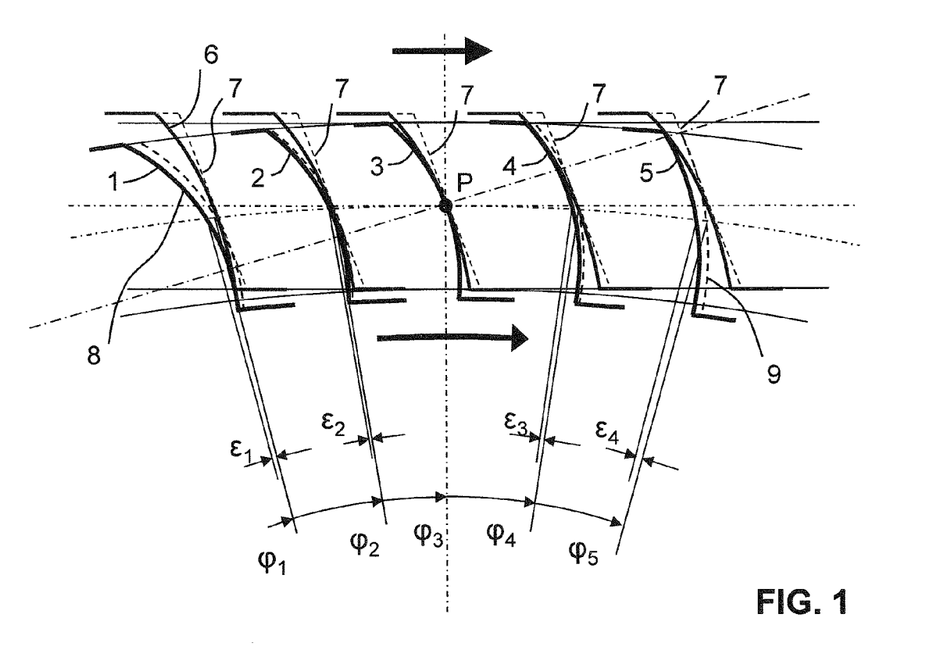
FIG. 1 shows a diagram intended to illustrate the engagement between an involute tooth flank and a modified worm flank.

FIG. 1 illustrates the engagement between an individual unmodified tooth flank 8 of a gear-like dressing tool and a modified grinding worm flank 6 during generation (rolling) in an axial section through the worm, wherein the worm is dressed for grinding a toothing with a profile (depth) crowning. An arbitrary shape of the profile crowning is assumed for the example; however, the relationships are in principle the same for any other kind of modification. The tooth flank 8 of the dressing tool is shown in various rolling positions 1, 2, 3, 4 and 5 in engagement with the modified worm flank 6. For comparison, the thin line shown in dashes shows an unmodified worm flank 7. Line 9, which is likewise a thin dashed line, indicates the respective position which the tooth flank 8 would occupy if it were to coincide with an unmodified worm. Thus, line 9 shows the respective theoretically correct position of the tooth flank according to the law of gearing. To make the process more clearly visible, the modification of the worm flank is shown in greatly accentuated form. When the worm rotates, the worm flank 6 moves from left to right; the meshing dressing tool with the single tooth consequently rotates clockwise from rolling position 1 to rolling position 5 and, during this process, occupies rolling angles $\varphi_1$, $\varphi_2$, $\varphi_3$, $\varphi_4$ and $\varphi_5$.

In the present example, the angle of rotation of the tooth flank 8 lags behind the theoretically correct position by a rotation angle deviation $\varepsilon_1$ at the beginning of engagement at rolling angle $\varphi_1$. This can also be referred to as "trailing". As rolling progresses—in the second position at rolling angle $\varphi_2$—this trailing decreases to $\varepsilon_2$ and, approximately at the pitch point P at $\varphi_3$ (the precise position is dependent on the modification on the worm flank), it disappears completely. Subsequently, up to $\varphi_4$, the rotation angle deviation increases again to $\varepsilon_3$ and, right at the end of engagement, at rolling angle $\varphi_5$, it increases to $\varepsilon_4$. This trailing or, more generally, the progress of the rotation angle deviations ($\varepsilon$ values) along the rolling path is thus a reproduction of the modification on the worm flank at the shift position under consideration. It can also easily be seen that this kind of rolling is only possible if there are no immediately following or preceding flanks since, under certain circumstances, these would prevent flank contact taking place in the region around the pitch point P.

Figure 2:
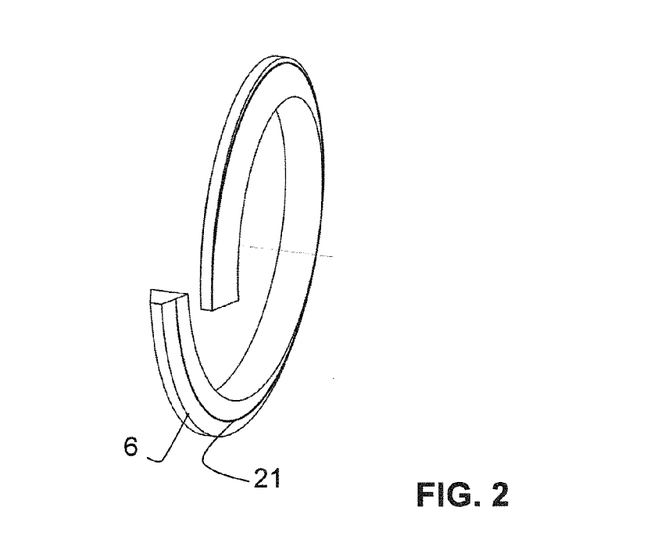
FIG. 2 shows an illustration of a contact track on a grinding worm flank.

As can be seen from FIG. 1, there is generally only point contact between the toothing of the dressing tool and the grinding worm flank. By means of the rolling movement, a contact track of the dressing tool is thus produced on the worm flank 6. FIG. 2 illustrates part of such a contact track 21. The contact track 21 extends in a spiral across the flank, over about two thread pitches from the tip to the root. In FIG. 2, only the first thread pitch is shown. This spiral shape of the contact track 21 is almost independent of the geometry of the toothing of the dressing tool.

Figure 3:
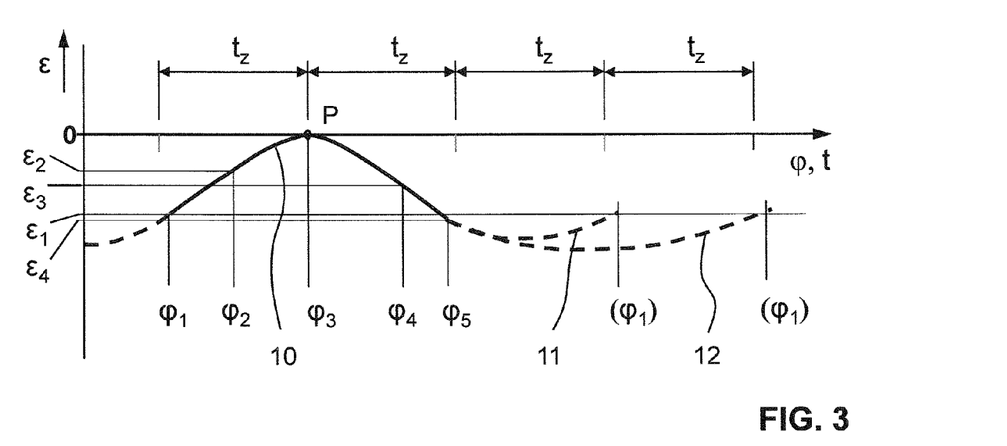
FIG. 3 shows a schematic displacement/time diagram of a micromovement.

FIG. 3 plots the progress of the rotation angle deviation $\varepsilon$ of the dressing tool against the rolling angle $\varphi$. The above-mentioned rolling angles $\varphi_1$ to $\varphi_5$ are likewise plotted in the diagram. If it is assumed that the basic speed $n_g$ is constant, it is also possible to use the time axis t as the abscissa. In this case, the values $\varphi_1$ to $\varphi_5$ denote the points in time at which the corresponding rolling angles are adopted. For purely geometrical consideration, the dependence on the rolling angle $\varphi$ is more suitable, but the time t is more advantageous for kinematic analysis. The diagram thus illustrates the progress of an additional rotary movement ("micromovement") of the dressing tool, which is superimposed on the basic rotary movement.

In the diagram, the time required for completely generating one tooth pitch is plotted as $t_z$. The solid line 10 represents that part of the micromovement function which is given by the geometry of the worm flank modification for the duration of engagement. Comparison between the time $t_z$ for completely generating one tooth pitch and the engagement duration shows that the degree of overlap in this example is barely 2. Only at point P, i.e. in the vicinity of the pitch point, is the rotation angle deviation zero; at all other points, the rotation angle of the dressing tool lags behind the position which the dressing tool would occupy during generation with an unmodified worm.

After the run out of the flank under consideration at $\varphi_5$, it is ensured that the next flank arriving for generation is positioned in such a way that, at $\varphi_1$, it once again runs in correctly with the deviation $\varepsilon_1$. For this purpose, use is made of a transition function, which is illustrated in dashed lines in FIG. 3. Transition function 11 is suitable if in each case two teeth are omitted between the active teeth. Transition function 12, in contrast, is suitable if three teeth are omitted. In principle, the exact progress of the transition function between $\varphi_5$ and $\varphi_1$ is not significant since, of course, the tooth flanks are out of engagement. However, they will expediently be defined in such a way that the accelerations remain minimal; that is to say, the second derivative of the transfer function with respect to time (expressed mathematically: $d^2\varepsilon/dt^2$) should remain as small as possible in terms of magnitude. For this purpose, the transition function selected should always be capable of differentiation. Where three teeth are omitted, the transition function covers about two tooth pitches; by its very nature, its progress can therefore be somewhat gentler.

Figure 4:
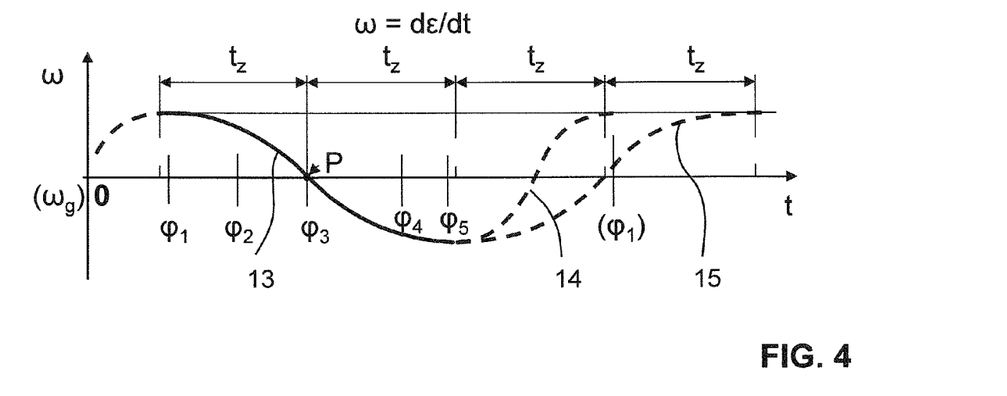
FIG. 4 shows a schematic speed/time diagram of the micromovement in FIG. 3.

FIG. 4 shows the speed profile of the "micromovement function", which is obtained if the path profile in FIG. 3 is differentiated with respect to time t. The solid line 13 represents the profile of the speed in the generating zone, while the dashed lines 14 and 15 represent the two transition functions, once again respectively for the case where two or three teeth are omitted.

If the basic rotation of the rolling movement is also taken into account, this function is displaced upward by the angular speed $\omega_g$ of the basic rotation, wherein this angular speed is obtained from the angular speed $\omega_s$ of the worm, the number of threads g of the worm, the design number of teeth z for the dressing gear and the shift speed $v_y$. However, if only the superimposed micromovement is considered, the t axis intersects the ordinate at $\omega=0$.

The respective transition function already mentioned above is defined in such a way that the speed at the entry of the next flank at $\varphi_1$ into the generating zone coincides with the geometry-producing angular speed, required there, for the micromovement.

As can be seen from FIGS. 3 and 4, an approximately periodic profile is obtained for the path and speed of the micromovement, said profile being similar to a sine function in the present example. The time average of the speed of the micromovement for one period (and hence also the time average for the entire dressing operation) is virtually zero. Of course, modifications of different types on the grinding worm flanks result in somewhat different profiles; however, the basic character of the functions is always approximately the same. Here, the basic frequency of the micromovement is dependent on the respective number of teeth omitted from the dressing tool: if each third tooth is present, it is one third of the tooth frequency $f_z=1/t_z$; if only every fourth tooth is present, it is one quarter of $f_z$ etc. Here, the following applies numerically to the tooth frequency in Hz: $f_z$ [Hz]=$n_s$ [rpm] ·g/60, where $n_s$ denotes the grinding worm speed in revolutions per minute and g denotes the number of worm threads.

The basic rotary movement and the superimposed micromovement can be produced by a common drive unit or by respective separate drive units. This is explained in greater detail below with reference to FIGS. 5-7.

Figure 5:
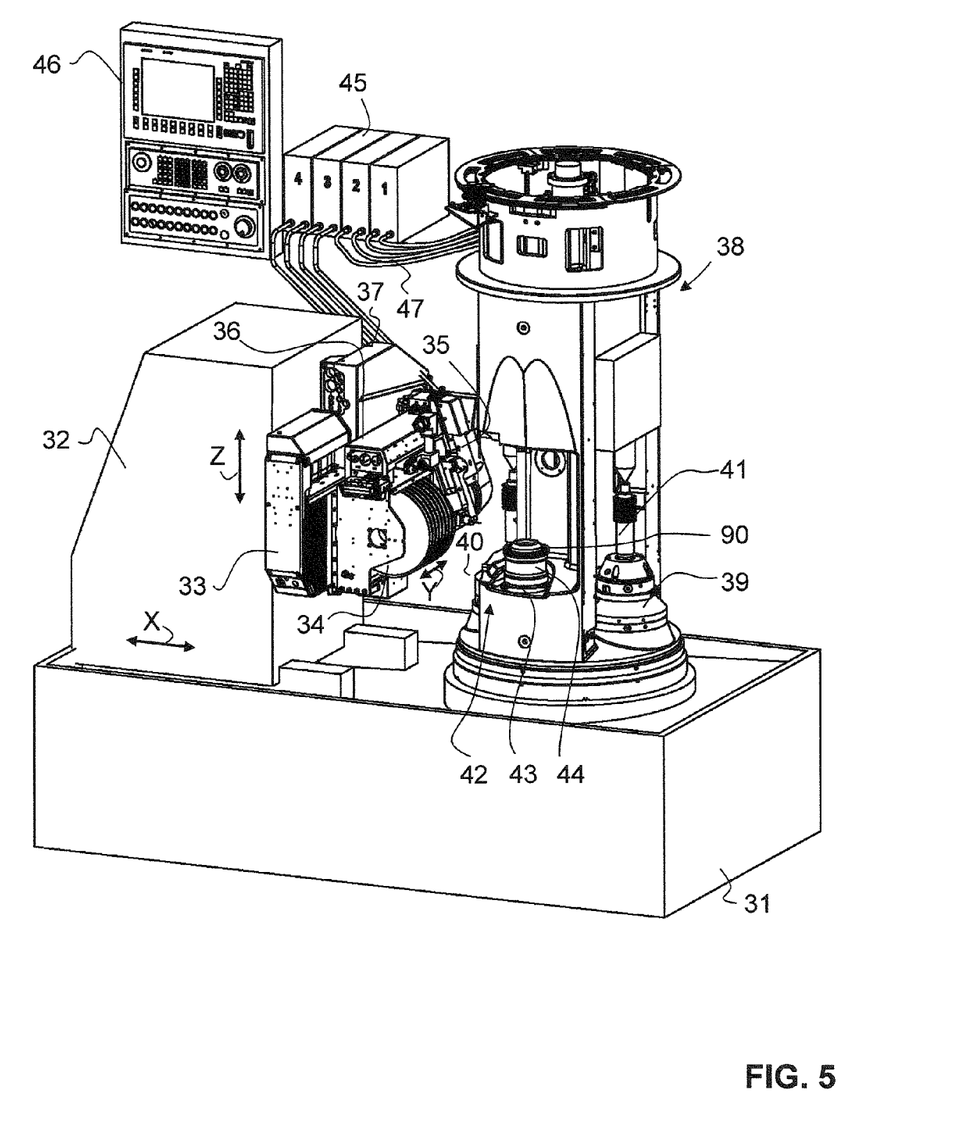
FIG. 5 shows the construction of a machine tool for continuous generation grinding in a schematic illustration.

By way of example, FIG. 5 shows a generation grinding machine specifically designed for carrying out the method explained above.

The machine has a machine bed 31 with a tool carrier 32 that can be moved horizontally (in the X direction). Mounted on this tool carrier 32 there is furthermore a slide that can be moved vertically (in the Z direction), on which a grinding head 33 with a shift slide 36 that can be moved in the Y direction and a grinding worm 34 mounted rotatably thereon are mounted. The grinding worm 34 is driven in rotation by an electric drive motor 35. By means of the shift slide 36, the grinding worm 34 can be shifted along the axis thereof during operation. For this purpose, the shift slide has an electric-motor shift drive 37. The grinding head 33 can be pivoted relative to the tool carrier 32 about an axis parallel to the X direction. Here, the coordinate system X-Y-Z is not orthogonal since the Y axis is not perpendicular to the Z axis but slopes relative thereto by the (individually adjustable) angle of inclination; however, a generation grinding machine with an orthogonal coordinate system can also be used.

A work carrier 38 in the form of a turret is furthermore mounted on the machine bed 31. The work carrier carries two electric-motor driven work spindles 39, 40, on each of which one workpiece 41 in the form of a spur gear shaft is clamped for machining in the example under consideration. In the example under consideration, one work spindle 40 is in a machining position, in which the associated workpiece can be machined by the grinding worm 34. The other work spindle 39 is situated in a loading and unloading position, in which a fully machined workpiece is removed and a new workpiece to be machined can be clamped. A dressing unit 42 is arranged on the work carrier 38 at an offset angle (here at 90°) relative to the work spindles. By rotating the work carrier 38, this dressing unit is brought into the machining position in order to dress the grinding worm 34.

The dressing unit 42 comprises two drives: a basic drive 43 (only partially visible in FIG. 5) and an additional drive 44, which is mounted on the spindle of the basic drive 43 in order to superimpose rapid additional rotary movements (micromovements) on a basic rotary movement produced by the basic drive 43. A gear-like dressing tool 90 is clamped on the spindle of the additional drive 44.

The various drives of the generation grinding machine are controlled by an NC control unit 45. A CNC operating unit 46 is used to operate the NC control unit. In the example under consideration, only four NC modules of the NC control unit 45 are shown. The first two modules control the basic drive 43 and the additional drive 44 of the dressing unit 42. The other two modules control the drive motor 35 of the grinding worm 34 and of the shift drive 37 to move the shift slide 36. Further NC modules that are not shown are used to control the further drives. Feed lines 47 connect the NC modules to the various drives. The NC control unit 45 carries out software for controlling the drives.

During dressing, the basic drive 43 produces the basic speed for the dressing tool 90 in accordance with parameters that determine the dressing process, such as grinding worm speed $n_s$, number of worm threads g, design number of teeth z of the dressing tool and shift speed $v_y$. The additional drive 44 superimposes rapid additional rotary movements on this basic speed under the control of the software.

Figure 6:
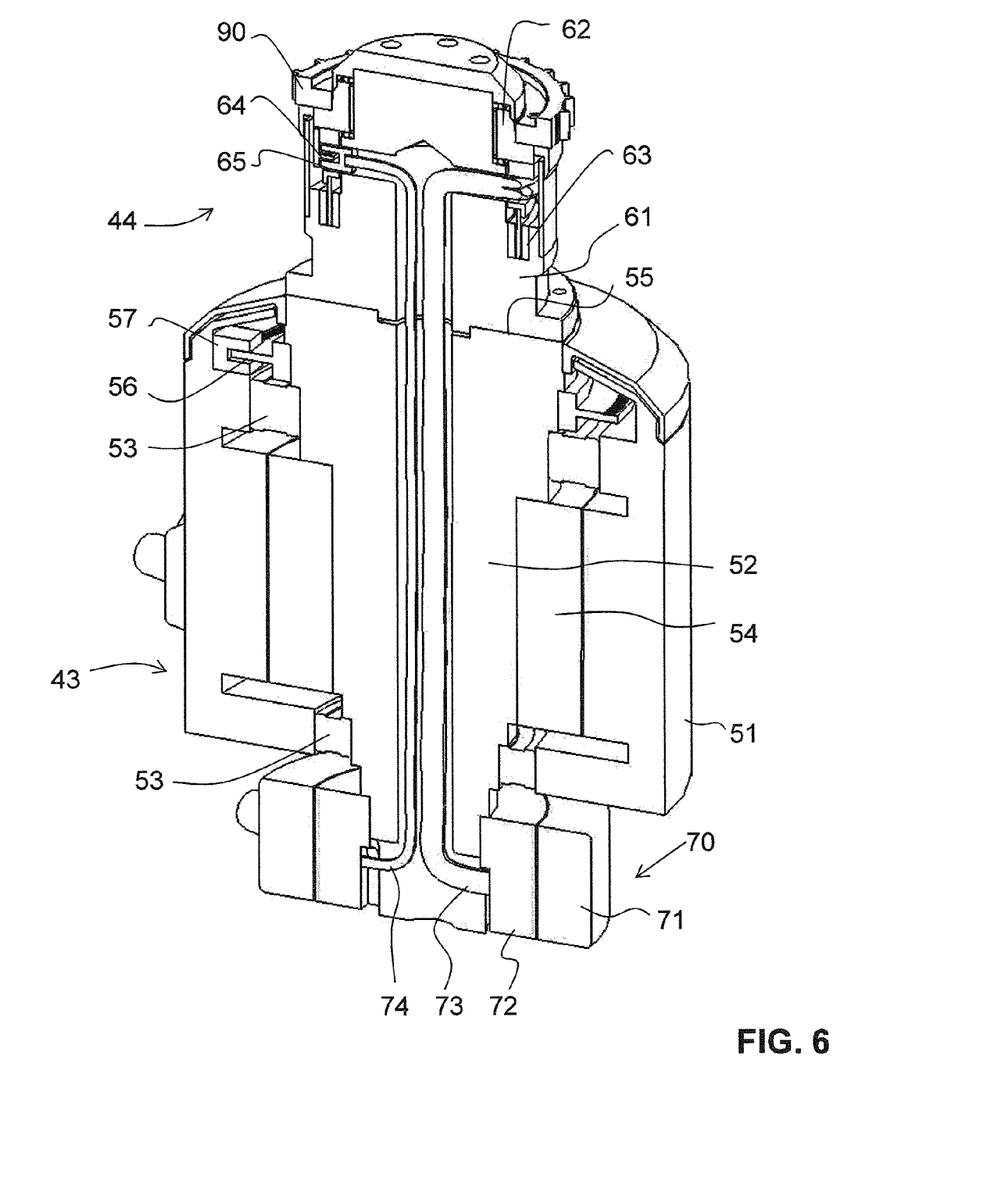
FIG. 6 shows a schematic section through a dressing device for producing rotary micromovements.

A possible embodiment of the basic drive 43 and of the additional drive 44 is shown in axial section in FIG. 6. The basic drive 43 is constructed in a known manner and comprises a housing 51, a main spindle 52, spindle bearing 53 and a drive motor 54. Arranged close to the upper spindle end 55 is a rotation angle measurement system, having a measurement disk 56 and a reading head 57. The additional drive 44 is mounted on the upper spindle end 55. This drive comprises all the necessary elements for a high-accuracy NC axis: a housing 61, a spindle 62 (annular here), a drive motor 63 (likewise annular here) and a measurement system having a measurement disk 64 and a reading head 65. To enable the motor 63, which rotates with the main spindle, and the reading head 65 of the measurement system to be supplied with power, a rotary feed-through 70 having a stator 71 and a rotor 72 is provided, being situated at the lower end of the main spindle. Feed lines from and to the NC control unit are connected to the stator 71 of the rotary feed-through 72. Energy and data are transferred between the stator 71 and the rotor 72 via slip rings or inductively (by means of two concentric coils in the stator 71 and rotor 72) and optionally optically. Current is passed from the rotor 72 to the additional drive 44 through the main spindle 52 via a power cable 73 and a measurement line 74.

Figure 7:
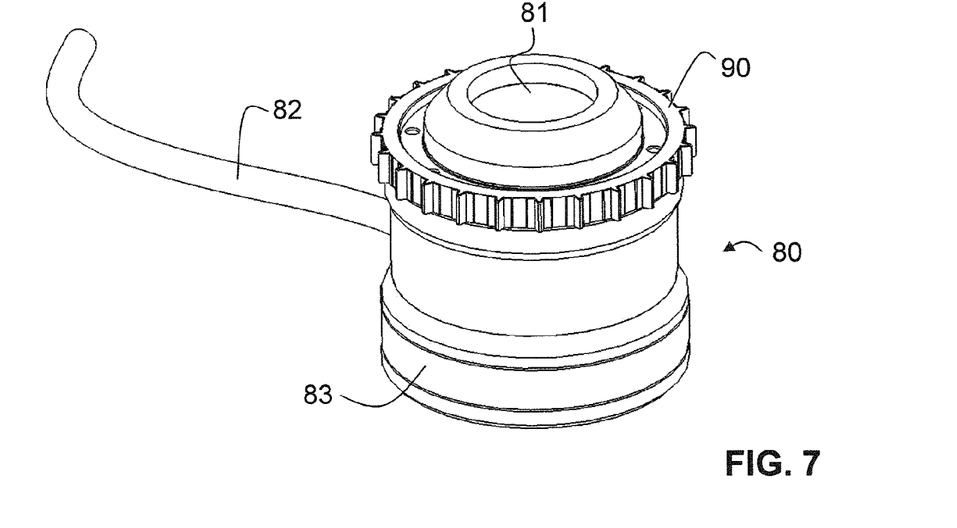
FIG. 7 shows an example of a dressing device for clamping on the work spindle.

FIG. 7 shows an example of a dressing device which is suitable for clamping on the work spindle of a generation grinding machine that is not prepared mechanically especially for the novel dressing method described here. This dressing device makes available an additional drive for the work spindle in order to produce rapid rotary movements in addition to the basic rotary movement of the work spindle. For dressing, the dressing device 80 is centered and clamped on the work spindle with the aid of the clamping bore 81. Both power supply and data exchange with the NC controller take place via a connecting cable 82 (depicted only schematically) for current supply and measurement data and via a rotary feed-through 83. The device contains an additional drive of the abovementioned type and a measurement system. The dressing tool 90 is clamped on the dressing device. It can be exchanged easily, e.g. once the end of the service life has been reached or when the intention is to convert to a workpiece with different toothing data.

In contrast to the variant shown in FIG. 6, the dressing device in FIG. 7 can also be used on machines which have been constructed mechanically primarily for some other dressing method and therefore do not have a separate dressing spindle or no rotary feed-through on the work spindle.

Figure 8:
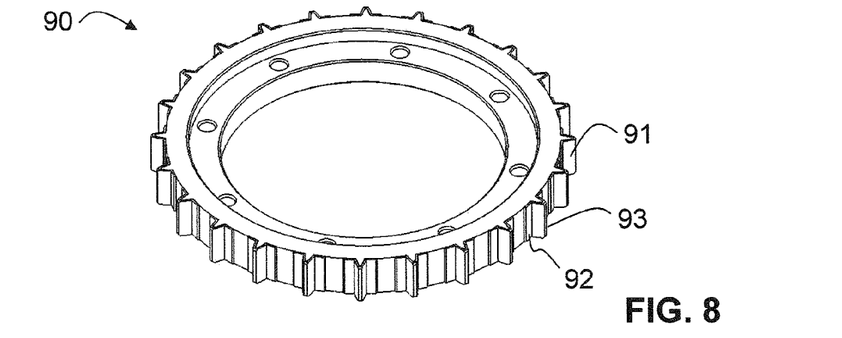
FIG. 8 shows a first example of a dressing tool with regularly distributed active teeth.

FIG. 8 shows an example of a dressing tool 90 according to the invention in which in each case two teeth are omitted between any two remaining teeth 91. The remaining teeth are coated with a layer of hard material grains, e.g. diamond grains; moreover, the tooth thickness thereof is somewhat reduced to eliminate the possibility of two-flank contact with the grinding worm flanks during dressing. In addition to the tooth flanks, portions 92 at the tooth root for turning the grinding worm outside diameter and at the tooth tip 93 for plunge cutting the root of the worm thread are coated with hard material grains.

This example shows a straight-toothed dressing tool; however, this can also be helically toothed with a left-hand or right-hand slope as long as the condition that two flanks never have simultaneous contact with the worm flanks is satisfied.

In the description of the method, an unmodified involute gear has been assumed for the dressing tool. However, this is not a prerequisite; toothing on the dressing tool that is crowned or modified in some other way works just as well.

With the dressing tool in FIG. 8, it is not possible to dress a grinding worm, the number of threads of which can be divided by three, without partial operations. For these cases, there is a need either for a tool on which in each case three teeth have been omitted or on which the active teeth have an irregular distribution over the circumference. Thus, two, then three, then once again two etc. teeth can be omitted, for example. The software for controlling the micromovement is then matched to the irregular pitch. In particular, the different transition functions should be correctly associated with the rotational position of the tool in terms of software. A large number of such irregular pitches is conceivable and it should be checked in each case how well-suited a particular distribution pattern is to the number of threads to be dressed. Fundamentally, the following applies: the higher is the percentage of active teeth of the design number of teeth z, the more efficient is the dressing process.

Figure 9:
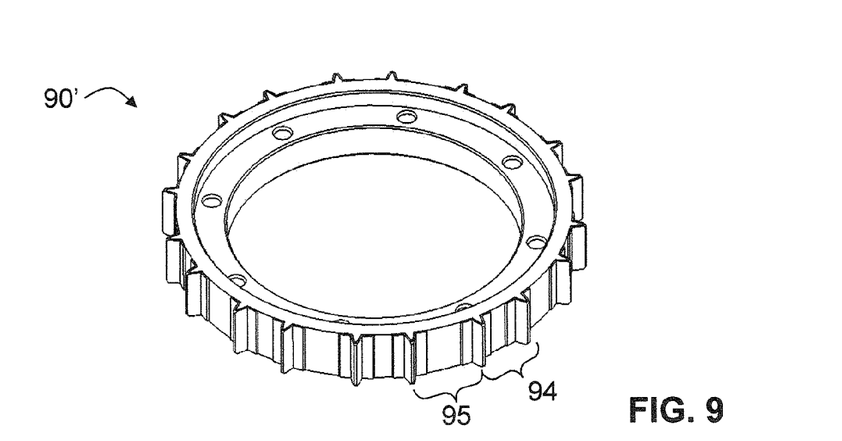
FIG. 9 shows a second example of a dressing tool with irregularly distributed active teeth.

FIG. 9 shows an example of a dressing tool 90' with nonuniform distribution of the active teeth. Two teeth have been omitted in region 94, then three teeth in region 95, then once again two teeth etc. The basic pitch is therefore seven teeth; this version is therefore not suitable for 7-, 14-, 21-. . . thread grinding worms. To enable the pattern for the position of the active teeth to be distributed regularly over the circumference in this example, the design number of teeth z must be divisible by seven.

In the above description of the method and of the dressing tool, it is assumed that the toothing of the dressing tool is involute toothing. This is primarily because this type of toothing is by far the most widespread and the most used in the gearing industry, but also because the relationships can be presented particularly well and are particularly clear in this case. In principle, however, the method can be used in all cases in which grinding worms are to be dressed for continuous generation grinding, that is to say also for any other toothing that can be machined by generation methods.

As already mentioned above, it is not a prerequisite, in the case of a dressing tool having involute toothing, for example, for the tooth flanks thereof to be pure involutes, i.e. to be completely unmodified. Since most sets of teeth that are ground nowadays generally have slight profile crowning, it may be expedient likewise to make such a modification to the dressing tool. In effect, this leads to the micromovements of the dressing tool during the dressing of a grinding worm provided for grinding crowned toothing being smaller overall. Depending on the drive in the dressing device, this may allow higher dressing speeds. In the case where such modified dressing tools are used, the actual shape of the dressing toothing is taken into account in an appropriate manner by the software. It is then not the difference with respect to the theoretical tooth flank shape but that with respect to the modified tool flank which has to be taken into account in calculating the micromovement for the production of the required modification on the grinding worm flank.

While an additional rotary movement of the dressing tool is in each case produced in the examples discussed above, it is also conceivable as an alternative or in addition to produce an additional rotary movement of the grinding worm instead. This can be achieved by corresponding control of the grinding worm drive, or an additional drive can be provided for this purpose in analogy to the additional drive discussed above for the dressing tool. As an alternative or in addition, it is also possible for a linear additional movement to be superimposed on the shift movement and/or the X movement. This can be achieved by means of appropriate control of the drive for the shift slide or the X axis, or a corresponding additional drive that can produce small, rapid axial movements of the grinding worm or of the dressing tool with high precision can be provided for this purpose.

The invention claimed is:

1. A method for dressing a single- or multi-thread grinding worm, comprising:
    driving the grinding worm to perform a basic rotary movement around a grinding worm axis;
    driving a gear-like dressing tool to perform a basic rotary movement around a dressing tool axis, the dressing tool axis extending crosswise with respect to the grinding worm axis; and
    producing a shift movement between the dressing tool and the grinding worm along the grinding worm axis,
    wherein the basic rotary movement of the grinding worm, the basic rotary movement of the dressing tool and the shift movement are coupled in such a way that the grinding worm and the dressing tool perform a basic rolling movement; and
    producing an additional relative movement between the grinding worm and the dressing tool, wherein the additional relative movement is superimposed on the basic rolling movement in order to produce modifications of at least one flank of the grinding worm,
    the additional relative movement being produced by at least one of the following:
    superimposing on the basic rotary movement of the dressing tool an additional rotary movement of the dressing tool around the dressing tool axis;
    superimposing on the basic rotary movement of the grinding worm an additional rotary movement of the grinding worm around the grinding worm axis; and
    superimposing on the shift movement an additional axial movement between the grinding worm and the dressing tool along the grinding worm axis.

2. The method as claimed in claim 1, wherein the additional relative movement is produced by superimposing on the basic rotary movement of the dressing tool the additional rotary movement of the dressing tool, and the additional rotary movement around the dressing tool axis is superimposed on the basic rotary movement of the dressing tool in order to produce at least part of the additional relative movement.

3. The method as claimed in claim 2, wherein both the basic rotary movement of the dressing tool and the additional rotary movement of the dressing tool are produced by a common drive.

4. The method as claimed in claim 3,
    wherein the dressing tool is clamped instead of a workpiece on a work spindle having a work spindle drive, and wherein the work spindle drive produces both the basic rotary movement of the dressing tool and the additional rotary movement of the dressing tool.

5. The method as claimed in claim 3, wherein the dressing tool is clamped on a separate dressing spindle having a dressing spindle drive, and wherein the dressing spindle drive produces both the basic rotary movement of the dressing tool and the additional rotary movement of the dressing tool.

6. The method as claimed in claim 1, wherein the basic rotary movement of the dressing tool and the additional rotary movement of the dressing tool are produced by separate drives.

7. The method as claimed in claim 6,
wherein the dressing tool is clamped on a spindle of an additional drive,
wherein the additional drive is clamped on a work or dressing spindle,
wherein the work or dressing spindle produces the basic rotary movement of the dressing tool, and
wherein the additional drive produces the additional rotary movement of the dressing tool,
the additional drive being clamped on the work or dressing spindle in such a manner that the additional drive rotates around the work or dressing spindle axis with the basic rotary movement of the work or dressing spindle.

8. The method as claimed in claim 1, wherein the additional relative movement is produced by superimposing on the basic rotary movement of the grinding worm the additional rotary movement of the grinding worm around the grinding worm axis, and the additional rotary movement around the grinding worm axis is superimposed on the basic rotary movement of the grinding worm in order to produce at least some of the additional relative movement.

9. The method as claimed in claim 1, wherein the additional relative movement is produced by superimposing on the shift movement the additional axial movement between the grinding worm and the dressing tool along the grinding worm axis, and the additional axial movement between the grinding worm and the dressing tool along the grinding worm axis is superimposed on the shift movement in order to produce at least some of the additional relative movement.

10. The method as claimed in claim 1, wherein the dressing tool has one or more teeth on the outer circumference thereof, wherein the teeth have a tooth thickness in the circumferential direction and a tooth pitch in the circumferential direction which are selected in such a way that the dressing tool and the grinding worm make contact at at most a single contact point at any point in time during dressing.

11. The method as claimed in claim 10,
wherein the dressing tool is derived from a reference gear having a design number of teeth, the design number of teeth being the number of teeth which would be present on the circumference of the dressing tool if exactly one tooth were to plunge into each gap between two opposed flanks of the grinding worm during the rolling movement,
wherein the dressing tool has a number of teeth that is less than the design number of teeth, and
wherein between each pair of adjacent teeth of the dressing tool at least one tooth that would be present on the reference gear is missing on the dressing tool.

12. A gear-like dressing tool comprising a plurality of teeth, each tooth defining two tooth flanks, tooth roots, and a tooth tip,
wherein the tooth flanks are coated with hard material grains,
wherein zones at the tooth roots are coated with hard material grains for turning a grinding worm outside diameter and/or zones at the tooth tips are coated with hard material grains for plunge cutting a grinding worm thread root,
wherein the dressing tool is derived from a reference gear having a design number of teeth, the design number of teeth being the number of teeth which would be present on a circumference of the dressing tool if exactly one tooth were to plunge into each gap between two opposed flanks of the grinding worm during the rolling movement,
wherein the dressing tool has a number of teeth that is less than the design number of teeth, and
wherein between each pair of adjacent teeth of the dressing tool at least one tooth that would be present on the reference gear is missing on the dressing tool.

13. The dressing tool as claimed in claim 12, wherein the same number of teeth is missing between each pair of adjacent teeth of the dressing tool.

14. The dressing tool as claimed in claim 12, wherein the number of teeth that is missing between each pair of adjacent teeth of the dressing tool is not everywhere the same over the circumference of the dressing tool.

15. The dressing tool as claimed in claim 12, wherein two or three teeth are missing between each pair of adjacent teeth of the dressing tool.

16. An additional drive for driving a gear-like dressing tool,
wherein the additional drive is configured to be mounted on a work or dressing spindle of a machine tool, which produces a basic rotary movement around a work or dressing spindle axis, the additional drive being configured to be mounted on the work or dressing spindle in such a manner that the additional drive rotates around the work or dressing spindle axis with the basic rotary movement of the work or dressing spindle; and
wherein the additional drive is configured to be controlled in such a way by an NC controller that it superimposes an additional rotary movement around the work or dressing spindle axis on the basic rotary movement.

17. A machine tool comprising:
a grinding worm;
a grinding worm drive for producing a basic rotary movement of the grinding worm around a grinding worm axis;
a gear-like dressing tool;
a work or dressing spindle for producing a basic rotary movement of the dressing tool around a work or dressing spindle axis, wherein the work or dressing spindle axis extends crosswise with respect to the grinding worm axis;
a shift drive for moving the grinding worm and the work or dressing spindle relative to one another along the grinding worm axis;
a horizontal feed device for moving the grinding worm and the dressing tool toward one another and away from one another; and
an NC controller, which is configured to electronically couple the grinding worm drive, the work or dressing spindle and the shift drive in order to produce a basic rolling movement between the grinding worm and the dressing tool during a dressing process,
the NC controller being configured to additionally control the work or dressing spindle, the grinding worm drive, the shift drive and/or the horizontal feed device in such a way that an additional relative movement is superimposed on the basic rolling movement in order to produce additional modifications of at least one flank of the grinding worm, the additional relative movement being produced by at least one of the following:

superimposing on the basic rotary movement of the dressing tool an additional rotary movement of the dressing tool around the dressing tool axis;

superimposing on the basic rotary movement of the grinding worm an additional rotary movement of the grinding worm around the grinding worm axis; and superimposing on the shift movement an additional axial movement between the grinding worm and the dressing tool along the grinding worm axis.

18. The machine tool as claimed in claim 17, wherein the NC controller is configured to control the work or dressing spindle in such a way that an additional rotary movement around the dressing tool axis is superimposed on the basic rotary movement of the dressing tool in order to produce at least part of the additional relative movement.

19. The machine tool as claimed in claim 17, wherein the NC controller is configured to control the grinding worm drive in such a way that an additional rotary movement around the grinding worm axis is superimposed on the basic rotary movement of the grinding worm in order to produce at least some of the additional relative movement.

20. The machine tool as claimed in claim 17, wherein the NC controller is configured to control the shift drive in such a way that an additional linear movement between the grinding worm and the dressing tool along the grinding worm axis is superimposed on the shift movement in order to produce at least some of the additional relative movement.

21. The machine tool as claimed in claim 17, wherein the dressing tool has one or more teeth on the outer circumference thereof, wherein the teeth have a tooth thickness in the circumferential direction and a tooth pitch in the circumferential direction which are selected in such a way that the dressing tool and the grinding worm make contact at at most a single contact point at any point in time during dressing.

22. The machine tool as claimed in claim 17, wherein the dressing tool is derived from a reference gear having a design number of teeth, the design number of teeth being the number of teeth which would be present on the circumference of the dressing tool if exactly one tooth were to plunge into each gap between two opposed flanks of the grinding worm during the rolling movement, wherein the dressing tool has a number of teeth that is less than the design number of teeth, and wherein between each pair of adjacent teeth of the dressing tool at least one tooth that would be present on the reference gear is missing on the dressing tool.

23. A machine tool comprising:

a grinding worm;

a grinding worm drive for producing a basic rotary movement of the grinding worm around a grinding worm axis;

a gear-like dressing tool;

a work or dressing spindle for producing a basic rotary movement of the dressing tool around a work or dressing spindle axis, wherein the work or dressing spindle axis extends crosswise with respect to the grinding worm axis;

a shift drive for moving the grinding worm and the work or dressing spindle relative to one another along the grinding worm axis;

a horizontal feed device for moving the grinding worm and the dressing tool toward one another and away from one another;

an NC controller, which is configured to electronically couple the grinding worm drive, the work or dressing spindle and the shift drive in order to produce a basic rolling movement between the grinding worm and the dressing tool during a dressing process; and an additional drive for driving the dressing tool, wherein the additional drive is mounted on the work or dressing spindle in such a manner that the additional drive rotates around the work or dressing spindle axis with the basic rotary movement of the work or dressing spindle, and wherein the additional drive is configured to be controlled by the NC controller in such a way that it superimposes an additional rotary movement around the work or dressing spindle axis on the basic rotary movement of the dressing tool in order to produce additional modifications of at least one flank of the grinding worm.

\* \* \* \* \*